UNITED STATES PATENT OFFICE.

PERRY C. WADSWORTH, OF SANTA ANA, CALIFORNIA, ASSIGNOR TO TAYLOR'S, OF SANTA ANA, CALIFORNIA, A CORPORATION OF CALIFORNIA.

FOOD PRODUCT AND PROCESS OF MAKING THE SAME.

1,400,191.     Specification of Letters Patent.     Patented Dec. 13, 1921.

No Drawing.     Application filed November 17, 1919. Serial No. 338,454.

*To all whom it may concern:*

Be it known that I, PERRY C. WADSWORTH, a citizen of the United States, residing at Santa Ana, in the county of Orange and State of California, have invented a new and useful Food Product and Process of Making the Same, of which the following is a specification.

This invention relates to a food product in which fruit is the main ingredient, and also relates to the method whereby said product is made.

An object of the invention is to convert fruit into a cooked, palatable slab of any desired thickness.

Another object is to produce a fruit containing product which can be readily used by confectioners and others.

Other objects and advantages will appear in the subjoined detailed description.

The fruit to be used, according to this new process, is first cooked while whole, or cut into pieces and then cooked. The cooking operation is carried on until the fruit is tender. If citrus fruit is employed the oil and terpenes present in the peel are extracted in the cooking operation, and the fruit is separated therefrom by simply removing the cooked fruit from the liquid in which it is cooked, thus leaving the oil and terpenes in the liquid. After the fruit is thus cooked and the oil and terpenes are extracted, if the fruit has been cooked whole, it is quartered or otherwise suitably divided into pieces and imperfections in the skin are trimmed therefrom. The quartered and trimmed fruit is then chopped, ground or cut to the desired degree of fineness.

To the ground fruit is then added sugar and nulomoline which are thoroughly incorporated in the fruit by stirring and mixing, nulomoline being the commercial name for uncrystallizable cane sugar. This produces a soft pulpy mass which is allowed to stand for twenty-four hours, more or less. After standing for the requisite period of time, the mass is slowly heated to boiling temperature and maintained at such temperature for several minutes, and this operation produces a surplus quantity of liquid. This surplus liquid is then drained off and the residue is pressed into pans of such depth as to give the desired thickness to the finished slabs.

The pans and their contents are then placed in drying ovens and the product is partly dried in said ovens. The fruit slabs are then removed from the containers and the slabs are placed on trays and are then subjected to further drying in an oven or ovens to further reduce the amount of moisture in the slabs. After the second oven treatment curing is completed in the open air, such curing requiring a week, more or less.

Any suitable fruit may be employed for making this new food product and citrus fruit is particularly adapted to be treated by this process, since it contains a relatively large amount of pectose substances.

At the time of adding the sugar and nulomoline to the ground fruit, a suitable flavoring substance may also be added. Lemon juice, for example, may be added if oranges are employed. If sugar were used without the nulomoline in the product the finished slabs would crystallize more or less or harden to an undesirable degree and nulomoline without the sugar would produce too soft a product, but by combining these substances in suitable proportions the slab, when finished, is firm without being hard. The proportions of sugar and nulomoline employed will vary somewhat with different kinds of fruit.

I claim:

The process of making a food product which consists in cooking citrus fruit with its peel until tender, removing the cooked fruit from the liquid containing the oil and terpenes, mixing sugar and uncrystallizable cane sugar with the fruit thus treated, heating the mixture to boiling temperature, draining off the surplus liquid, molding the residue and drying to produce a substantially flat cake or slab of uniform consistency and permanent character.

Signed at Los Angeles, California, this 6th day of November, 1919.

PERRY C. WADSWORTH.

Witnesses:
GEORGE H. HILES,
F. H. TAYLOR.